J. H. HAUSER.
BRUSH CUTTER.
APPLICATION FILED DEC. 18, 1912.

1,058,970.

Patented Apr. 15, 1913.

Witnesses.
S. C. T. Thacher
R. Strohmayr

Inventor:
J. W. Hauser
by
Egerton R. Case
Atty.

UNITED STATES PATENT OFFICE.

JOHN HENRY HAUSER, OF KILLAM, ALBERTA, CANADA, ASSIGNOR OF ONE-HALF TO FRANCIS EDWARD NICHOL, OF KILLAM, ALBERTA, CANADA.

BRUSH-CUTTER.

1,058,970.      Specification of Letters Patent.      Patented Apr. 15, 1913.

Application filed December 18, 1912. Serial No. 737,440.

*To all whom it may concern:*

Be it known that I, JOHN HENRY HAUSER, a subject of the King of Great Britain, residing at the town of Killam, Province of Alberta, Canada, have invented certain new and useful Improvements in Brush-Cutters, of which the following is a specification.

My invention relatse to improvements in brush cutters, and the principal object of my invention is to construct a brush cutter so that the same may be mounted in front of and attached to any type of traction engine, and one which is simple in construction and mounted so that while it may be raised and lowered it will be held from sliding sidewise.

Another object of my invention is to construct my brush cutter so that the cutting blades or knives thereof will be positioned sufficiently below the platform of the cutter so that the sides of the cutter frame will cause the cut brush to be deposited at each side of the traction engine clear of the wheels thereof, and my brush cutter comprises a V-shaped frame which is provided with a push-bar which extends underneath the traction engine and is provided at its inner end with means whereby it is hinged to the draw-bar, a channel-iron bar being secured to each side of said frame to which are secured the cutting blades or knives, and a cutting cap-plate carried by the forward end of the cutter and securing the forward ends of the said cutting blades or knives together, suitable means being provided for bracing said push-bar from the front axle, and for raising or lowering the brush cutter, as hereinafter more particularly set forth.

Figure 1:
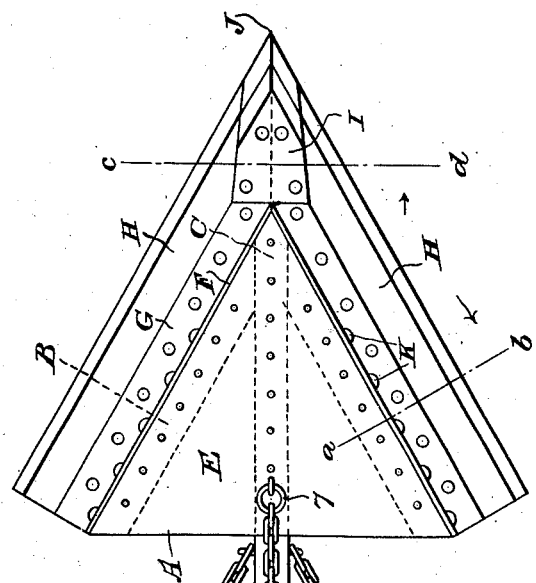
Figure 3:
Figure 2:
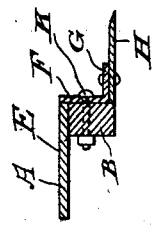

Figure 1 is a plan view of my brush cutter showing the same connected to a traction engine which is shown diagrammatically. Fig. 2 is a vertical cross section on the line *a—b*, Fig. 1, and Fig. 3 is a vertical cross section on the line *c—d*, Fig. 1.

In the drawings, like characters of reference indicate corresponding parts in each figure.

The V-shaped frame A is composed of the side-bars B which are secured by any suitable means not necessary to illustrate at their forward ends to the forward end C of the push-bar D.

E is the platform which is made of any suitable material, such as wood or sheet iron, and the same is suitably secured to the bars B and D. This platform holds the side bars B in a permanent relationship in respect of the push-bar D. Secured to each outer side of the bars B are channel-iron bars F, to the horizontal flanges G whereof are suitably secured the cutting blades or knives H. These knives or blades have their forward ends secured together and held in relationship by means of a cap-plate I which is suitably riveted or otherwise secured thereto. The forward end of this cap-plate is V-shaped and the sides thereof are sharpened, and placed in alinement with the cutting edges of the blades or knives H, thereby providing each side of the cutter with a cutting edge from the forward point J of the cutter to the rear ends of the said knives. As the traction engine advances, the brush cutter is brought into contact with the brush and so cuts it. Since the blades or knives H are a considerable distance below the platform E, the vertical flange K of each channel-iron bar F performs the function of causing the cut brush to be deposited clear of the wheels of the traction engine. It will of course be understood that the greatest transverse width of the brush cutter is sufficient to cause the cutter to cut a swath greater than the distance between the outer edges of the traction wheels of the engine to prevent the same from crushing the uncut brush.

The vertical flanges K are secured to the side bars B by any well-known means. The push-bar D extends underneath the traction engine, and the same is provided at its inner end with a clevis 2 which passes through the link O held in the draw-bar 3. 4 is a bolt which passes through the ends 5 of the said clevis. A chain or cable 6 is secured by any suitable coupling means 7 to the brush cutter, and this chain or cable is connected to a lever (not shown).

By the construction just described it is clear to one skilled in this art that the said brush cutter will be raised and lowered as occasion requires.

In order to prevent the cutter from sliding sidewise, and yet not interfere with the steering of the engine, I provide at each side of the push-bar D, a chain or cable 8 the inner ends of which are anchored by any suitable means to the front axle 9, and the outer ends of which are anchored by any suitable means to the push-bar D.

What I claim as my invention is:

1. A brush cutter comprising a V-shaped frame; a push-bar centrally incorporated with said frame and extending behind the same; a knife secured down each side of said frame and below the top thereof so that the sides of the frame will come in contact with the cut brush and cause it to be deposited at each side of the cutter; flexible coupling means carried by the inner end of said push-bar, and flexible supporting means connected to said push-bar behind the said frame.

2. A brush cutter comprising a V-shaped frame; a push-bar centrally incorporated with said frame and extending behind the same; a knife secured down each side of said frame and below the top thereof so that the sides of the frame will come in contact with the cut brush and cause it to be deposited at each side of the cutter; a cap-plate having a V-shaped end forming cutting sides, secured to the forward ends of said knives and overlapping the same so as to brace them together; flexible coupling means carried by the inner end of said push-bar, and flexible supporting means connected to said push-bar behind the said frame.

3. In a traction engine, the combination with the draw-bar and the steering axle thereof, of a brush cutter comprising a V-shaped frame provided down each side with a knife; a push bar centrally incorporated with said frame and extending back of same and underneath said engine; means carried by the inner end of said push-bar whereby the same has flexible connection with said draw-bar, and flexible means connected to each end of said steering axle and to said push-bar to prevent the said cutter from sliding sidewise, as set forth.

In testimony whereof I affix my signature in presence of two witnesses.

JOHN HENRY HAUSER.

Witnesses:
JAMES R. LARGE,
FRANK SLAGHT.